Jan. 15, 1957 M. B. NEUWORTH 2,777,881
CATALYTIC CONVERSION OF METHYL PHENOLS
Filed June 18, 1953 2 Sheets-Sheet 1

INVENTOR.
MARTIN B. NEUWORTH
BY
D. Leigh Fowler, Jr.

Jan. 15, 1957   M. B. NEUWORTH   2,777,881
CATALYTIC CONVERSION OF METHYL PHENOLS
Filed June 18, 1953   2 Sheets-Sheet 2

INVENTOR.
MARTIN B. NEUWORTH
BY
D. Leigh Fowler, Jr.

United States Patent Office 2,777,881
Patented Jan. 15, 1957

2,777,881

CATALYTIC CONVERSION OF METHYL PHENOLS

Martin B. Neuworth, Pittsburgh, Pa., assignor to Pittsburgh Consolidation Coal Company, Pittsburgh, Pa., a corporation of Pennsylvania Application June 18, 1953, Serial No. 362,470

Claims priority, application Great Britain August 6, 1952

15 Claims. (Cl. 260—621)

This invention relates to the vapor phase catalytic conversion of methyl phenols and, more particularly to the isomerization and disproportionation of those methyl phenols having no more than three methyl radicals i. e., cresols, xylenols, and trimethyl phenols.

Cresols, xylenols and trimethyl phenols occur in coal carbonization tars, coal hydrogenation products, shale oils, some petroleum crudes, lignite tars and the like. In their unrefined state, they exist as mixtures of isomers in different relative proportions. The distribution of the isomers within a particular raw material frequently is unfavorable: i. e., certain of the valuable isomers are present in small quantities whereas other less valuable isomers predominate in the mixture. Thus it frequently is desirable to alter the isomer distribution of the methyl phenols by selectively converting the less desirable isomers into more valuable isomers.

The primary object of this invention is to effect isomerization and disproportionation of a feed material containing methyl phenols having no more than three methyl groups.

A specific object of the present invention is to convert ortho-cresol into a mixture of meta- and para- cresols having a high ratio of meta- to para- cresol.

According to the present invention, methyl phenols having no more than three methyl groups are passed in the vapor phase through a bed of silica-alumina catalyst upon which a layer of carbon has been deposited comprising at least 5 percent by weight of the fresh catalyst. The conversion reaction is carried out at about 450 to 700° F. and preferably at atmospheric pressures, although the partial pressure of the methyl phenols may be reduced by the addition of inert gases such as nitrogen, flue gases and the like.

The prior art shows that methyl phenols have been subjected to isomerization reactions in the liquid phase involving elevated pressures and accompanying expensive and cumbersome apparatus. Long residence times required by these liquid phase reactions minimize the throughput of these processes.

Vapor phase reactions with silica-alumina catalysts for isomerizing and dealkylating alkyl phenols also are shown in the prior art as applicable to those alkyl phenols having alkyl substituents with three or more carbon atoms. The products of such dealkylations are a phenol and a straight or branched chain olefin. These reactions accordingly are in hydrogen balance. A corresponding dealkylation of methyl substituted phenols is a hydrogen deficient reaction which cannot be carried out in the absence of extrinsic hydrogen.

Fresh silica-alumina catalysts exhibit a high activity and a low selectivity towards methyl phenols, i. e., with fresh catalyst, high conversions are obtained (high activity) but very little of the converted material is a desirable product (low selectivity); instead, most of the converted material is carbon and high boiling residue which is substantially less valuable than the original methyl phenols.

Silica-alumina has been widely used commercially as a catalyst for converting hydrocarbons, and especially petroleum hydrocarbons in the vapor phase, usually at temperatures of 800 to 900° F. and higher.

These reactions convert a portion of the feedstock to carbon which is deposited upon the catalyst, substantially diminishing its activity. This drastic reduction in activity necessitates regeneration of the catalyst before the carbon content reaches five percent of the weight of silica-alumina. Regeneration consists of substantially completely burning off the deposited carbon to restore the catalyst activity.

I have discovered that when a silica-alumina catalyst has had deposited upon its surface a layer of carbon comprising at least five percent of the weight of fresh catalyst, high conversions of methyl phenols can be obtained with corresponding high selectivity. In addition, my new process operates at 450 to 700° F., a range which is well below that of conventional vapor phase processes catalyzed by silica-alumina.

The silica-alumina catalysts adapted for use in my process are the well-known silica-alumina catalysts employed in cracking of hydrocarbon feedstocks. They generally consist essentially of 1–50 percent by weight of alumina and 99–50 percent by weight of silica, and preferably 1 to 20 percent of alumina and 99 to 80 percent of silica. It is to be understood that minor amounts (up to about 10% by weight) of other oxides may be present with substantially equivalent results. Examples of other oxides that may be present are magnesia, boria, and zirconia.

For a better understanding of my invention and its other objects and advantages, reference should be had to the following description and to the accompanying drawings in which.

Figure 1:
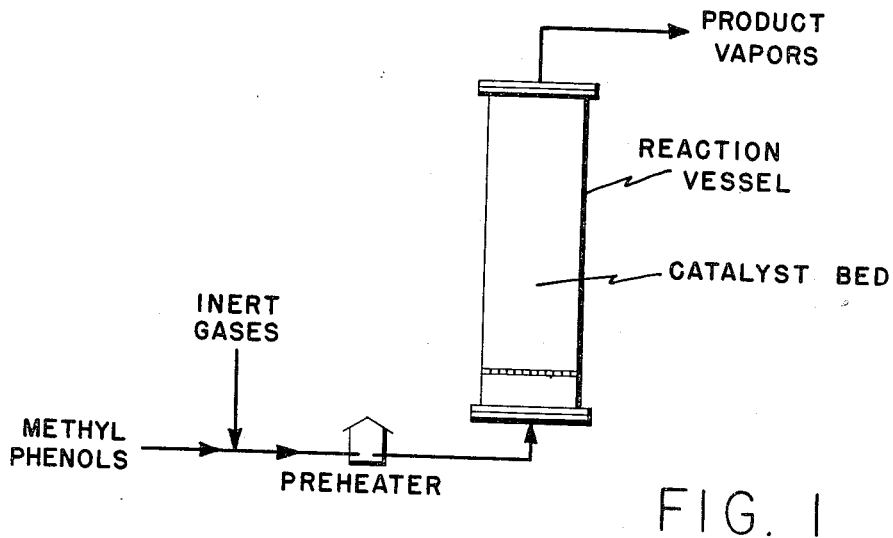
Figure 1 is a schematic flow-sheet of my new process.

Referring specifically to the flow-sheet of Figure 1, vaporized methyl phenols are passed through a catalyst bed contained in a reaction vessel. The contacting bed comprises a silica-alumina catalyst which has been coated with at least five percent of its weight of carbon. The bed is maintained at a temperature of about 450 to 700° F. Inert gases such as nitrogen, carbon dioxide, carbon monoxide, flue gases and the like may be added to the vaporized methyl phenols to reduce their partial pressure to a value of 0.1 to 1.0 atmosphere. Steam also can be employed as the diluent in my process despite its well-known capacity for poisoning silica-alumina catalysts. The liquid hourly space velocity (LHSV) of the reaction is preferably 0.1 to 5.0.

Product vapors are removed from the reaction vessel, condensed and separated to permit recovery of the condensed concerted methyl phenols. Unconverted methyl phenols are recycled to the reaction zone.

To commence operations, a carbon coating is deposited upon the fresh catalyst by passing vaporized hydrocarbonaceous material through the catalyst at an elevated temperature until the silica-alumina has picked up at least five percent of its weight as deposited carbon. For example, vaporized ortho-cresol may be passed through the fresh catalyst at 450 to 700° F. to deposit a coating of carbon on the fresh catalyst particles. Alternatively the carbon-depositing vapors may be a coal tar acid distillate fraction, such as cresol mixtures and xylenol mixtures, or creosotes, heavy distillable coal tar oils, distillable petroleum fractions, gas oils, fuel oils and the like. Inert gaseous diluents also may be used to lower the partial pressures of these carbon-depositing vapors to assure uniform carbon deposition over the catalyst surface.

Vaporized methyl phenols are passed through the carbon coated catalyst at a temperature of 450 to 700° F. Some of the methyl phenols being converted will appear as additional carbon on the catalyst. However the conversion to carbon which takes place at a rapid rate over fresh silica-alumina, is greatly reduced over silica-alumina which has five or more percent of carbon deposited on its surface, as will be described hereinafter in the discussion of Figure 2. The continued passage of methyl phenols through the catalyst bed gradually increases the carbon content of the catalyst, and also increases the selectivity of conversion. The activity of the catalyst decreases, although only slightly, with increased carbon content of the catalyst. When the activity of the catalyst is reduced (in a manner relatable to the carbon content) to a predetermined minimum allowable value, the flow of methyl phenols is discontinued to permit regeneration of the catalyst. The maximum carbon level, i. e., minimum catalyst activity, should be determined by economic considerations. I have found that commercially satisfactory conversion efficiency is obtained even when the catalyst contains 15 percent by weight or higher of carbon on the catalyst.

Regeneration by combustion of the deposited carbon with air at controlled temperatures is carried out when the conversion stage terminates. In batch operation, the carbon may be burned from the catalyst, and following each regeneration cycle a new layer of carbon is deposited on the regenerated silica-alumina from an inexpensive hydrocarbonaceous distillate feedstock, such as fuel oil, creosote or the like as previously described.

By employing several fixed bed reaction vessels in parallel, continuous conversion of the methyl phenols can be obtained through sequential operation of the vessels whereby at all times at least one of the vessels operates as a conversion reactor while others are being regenerated or having a fresh layer of carbon deposited upon the regenerated catalyst.

Continuous conversion also can be achieved by adopting the moving bed principle or the fluidized solids technique to the process. With a moving bed reaction system, the level of carbon on the catalyst in the reaction vessel is maintained at from 5 to about 20 weight percent of the fresh catalyst. Regeneration can be by total carbon combustion with subsequent redeposition of carbon. Flue gas from the regenerator may be employed to dilute the methyl phenols being introduced into the isomerization reaction.

Figure 3:
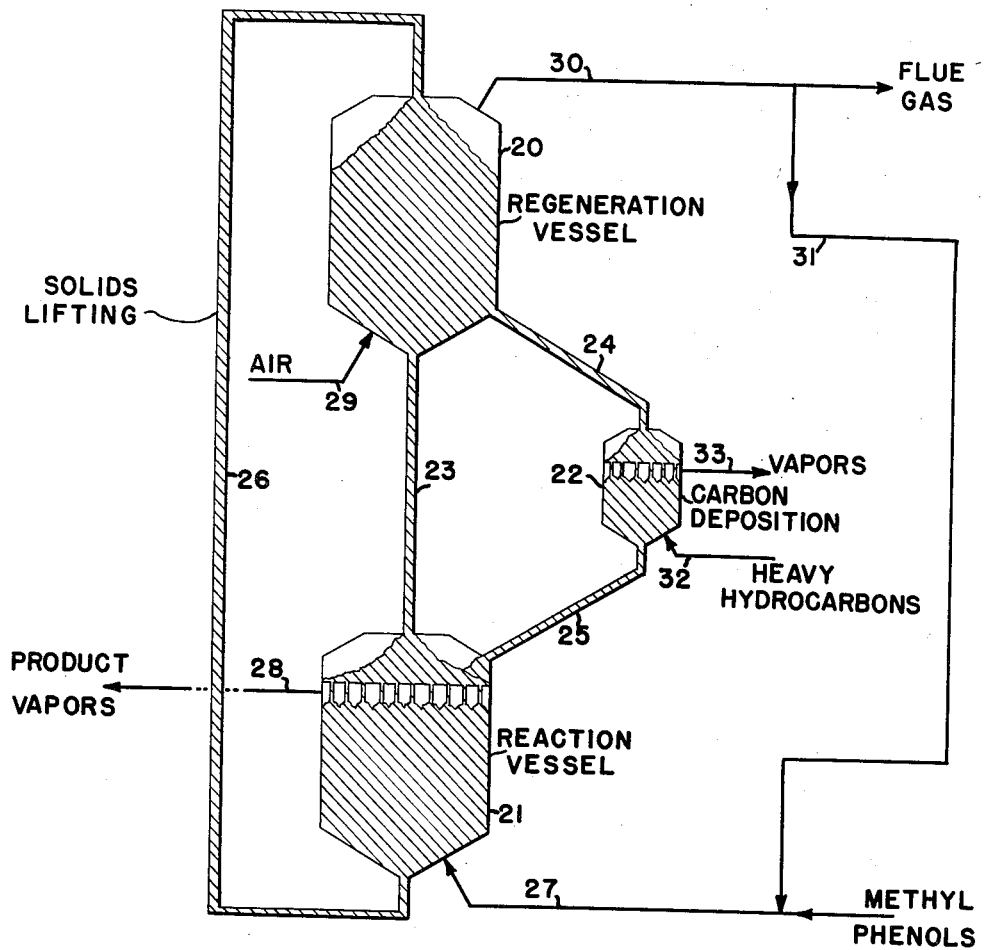
Figure 3 is a schematic flow sheet of apparatus for carrying out the present process continuously.

Figure 3 is a schematic illustration of apparatus for carrying out the present invention continuously in a downwardly moving bed system, comprising a regeneration vessel 20, a reaction vessel 21 and, if desired, a carbon deposition vessel 22. The flow of solid silica-alumina particles through the system is downward in the regenerator vessel 20 thruogh a conduit 23 into the reaction vessel 21. If desired a portion of the solids from the regenerator 20 may be withdrawn through a conduit 24 to the carbon deposition vessel 22 and returned to the recirculating stream of solids through conduit 25. Silica-alumina particles from the reaction vessel 21 are returned to the regenerator vessel 20 through a solids lifting device 26. While the illustration of Figure 3 shows a downwardly moving bed system, continuous operation also could be carried out with the fluidized solids technique for moving solid particles between reaction stages.

The solids entering the reaction vessel 21 have a carbon level of at least 5 percent by weight as previously described. Methyl phenols undergoing the catalytic treatment of the present invention are introduced into the reaction vessel through a conduit 27 and product vapors are withdrawn through a conduit 28. The rate of flow of catalyst and methyl phenols through the reaction vessel 21 is controlled to maintain a satisfactory level of catalyst activity. Uniformity of catalyst contacting conditions in the vessel 21 results in uniformity of product composition. The spent catalyst is withdrawn from the bottom of the reaction vessel 21 and returned to the regenerator vessel 20 where carbon is burned from the surface of the particles by combustion with air entering through conduit 29. Gaseous combustion products from the regenerator 20 are removed through a conduit 30. A portion of the discharged gases from conduit 30 can be recovered in conduit 31 and employed as a diluent for the methyl phenols undergoing treatment.

The regeneration in vessel 20 can be controlled so that the catalyst particles withdrawn through the conduit 23 retain a carbon coating of at least 5 percent by weight. When the regeneration operation is carried out accordingly, the carbon deposition vessel 22 is unnecessary.

Alternatively the catalyst in the regenerator 20 may be more fully freed of carbon by substantially total combustion and withdrawn through the conduit 24 to a carbon deposition vessel 22 for the application of a layer of fresh carbon in an amount at least 5 percent by weight. A heavy hydrocarbon oil or other inexpensive carbon depositing material is introduced through a conduit 32 into the vessel 22 to provide the necessary carbon coating. Vapors from the carbon laydown reaction are discharged through the conduit 33. The freshly prepared catalyst is withdrawn through conduit 25 for contacting the methyl phenols undergoing treatment in the vessel 21.

If desired, both of the alternatives may be carried out concurrently by withdrawing a portion of the regenerated catalyst from the vessel 20 through the conduit 23 and also through the carbon deposition vessel 22. The blended catalyst introduced into the reaction vessel 21 should have at least 5 percent of carbon by weight.

A few examples of conversions carried out according to my new process will serve to demonstrate its utility and effectiveness. The catalyst in the following examples was prepared especially for each feedstock by contacting fresh (i. e., zero carbon level) silica-alumina with the particular feedstock under reacting conditions until sufficient feedstock was decomposed to supply a carbon coating corresponding to at least 5 percent of the weight of silica-alumina. The fresh silica-alumina contained about 88 percent by weight of silica and about 12 percent by weight of alumina. The conversions were carried out by passing the vaporized methyl phenols downwardly through a fixed bed of catalyst. The abbreviation VMSV means vapor minute space velocity, i. e. the volume of vapor per volume of catalyst per minute.

*Table I.—Cresols*

| Run No. | 1 | 2 | 3 | 4 | 5 |
|---|---|---|---|---|---|
| Feed (Cresol) | ortho | ortho | ortho | meta | para |
| Temperature, °F | 550 | 650 | 750 | 650 | 650 |
| Partial Pressure, atm | 0.93 | 0.42 | 0.43 | 0.40 | 0.40 |
| VMSV | 1.4 | 7.45 | 8.1 | 7.3 | 7.0 |
| Results: | | | | | |
| Conversion (Wt. Percent of Feed) | 40.2 | 50 | 66 | 43 | 87 |
| Liquid Recovery (Wt. Percent of Converted Feed) | 93.8 | 91.2 | 92.6 | 93.6 | 96.6 |
| Yield as Wt. Percent of Converted Feed: | | | | | |
| Neutrals | 0.0 | 0.5 | 1.3 | 2.5 | 0.5 |
| Phenol | 31.5 | 27.8 | 25.8 | 17.3 | 20.4 |
| Isomerization Products (Cresols) | 24.7 | 29.0 | 27.2 | 35.2 | 39.4 |
| Other Disproportionation Products | 33.1 | 28.7 | 22.3 | 17.2 | 21.9 |
| Residue | 4.2 | 4.9 | 15.9 | 21.4 | 14.0 |
| Gas | 0.0 | 0.1 | 0.2 | 0.0 | 0.0 |
| Carbon | 6.2 | 8.7 | 7.2 | 6.4 | 3.4 |
| Meta/Para Cresol Ratio | 2.48 | 3.08 | 3.18 | | |

Table I shows the desirable conversions resulting from my new process as well as its versatility. Conversion of each of the cresol isomers is demonstrated. Appreciable conversion rates are accompanied by high liquid recoveries. The insignificant quantity of neutral product indicates that virtually no dehydroxylation of the cresols occurs during my process. Run 3 on ortho-cresol at 750° F. is included to show the marked increase in residue when temperatures exceeding 700° F. are employed.

Significant quantities of valuable phenol (i. e., demethylated cresol) result principally from disproportionation as is evidenced by the almost nonexistent gas yield and by the fact that the yield of other disproportionation products (i. e. xylenols and trimethyl phenols) corresponds to the phenol yield.

Figure 2:
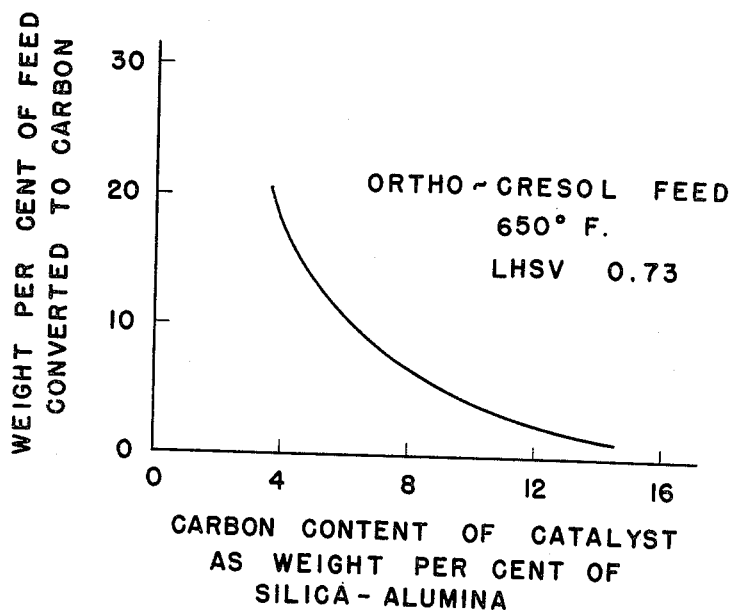
Figure 2 is a graphical representation showing the effect of catalyst carbon content upon the rate at which carbon is deposited from the feed materials.

Figure 2 shows the effect of the carbon level of the catalyst upon the rate at which fresh cresol feed is decomposed into additional carbon. The data from which the curve of Figure 2 is derived was developed from treating ortho-cresol at 650° F. over silica-alumina catalyst at several levels of carbon deposition. The liquid hourly space velocity (LHSV) was 0.73.

The curve of Figure 2 shows the marked decrease in the rate of carbon deposition on the catalyst which accompanies increasing carbon content of the catalyst. When the catalyst has less than about 5 percent carbon, substantial fractions of the feed cresol are degraded in value to carbon instead of being enhanced in value through conversion to desirable isomers. However with catalyst having more than 5 percent carbon, only small fractions of the feed cresol are decomposed to carbon. A similar relationship exists for the other methyl phenols.

The conversion rate for cresol decreases slightly as the carbon level of the catalyst increases, although commercially acceptable conversions are achieved when the catalyst has 15 percent carbon content and higher. Liquid recovery increases with increasing carbon content of the catalyst. Isomerization increases and disproportionation decreases with increasing carbon content of the catalyst. Moreover the meta-/para-cresol ratio of converted ortho-cresol increases with increasing carbon content of the catalyst.

Table II sets forth for purpose of comparison the results obtained with three different catalysts. Run 6 is the same as Run 2 shown in Table I. Each of the tests reported in Table II was conducted with ortho-cresol diluted with nitrogen to a partial pressure of 0.42 atmosphere. The LHSV of the reaction was 0.39.

*Table II.—Ortho cresol*

| Run No. | 6 | 7 | 8 |
|---|---|---|---|
| Temperature, °F | 650 | 650 | 650 |
| Catalyst | Silica-alumina | Silica-alumina-zirconia | Silica-magnesia |
| Results: | | | |
| Conversion (Wt. percent of Feed) | 50.0 | 44.1 | 4.9 |
| Liquid Recovery (Wt. percent of Converted Feed) | 91.2 | 93.4 | 62.3 |
| Yield as Wt. percent of Converted Feed: | | | |
| Neutrals | 0.5 | 0.0 | 0.0 |
| Phenol | 27.8 | 30.7 | 21.3 |
| m-cresol | 22.0 | 17.1 | 12.9 |
| p-cresol | 7.0 | 9.0 | 0.5 |
| Xylenol | 28.7 | 29.1 | 0.0 |
| Residue | 4.9 | 8.5 | 27.6 |
| Gas | 0.1 | 0.1 | 0.0 |
| Carbon | 8.7 | 6.5 | 37.7 |
| Meta/para cresol | 3.08 | 1.9 | 26.9 |

The silica-alumina of Run 6 contained about 88 percent silica and about 12 percent alumina. The catalyst of Run 7 contained 5.44 percent zirconia, 7.83 percent alumina and 86.73 percent silica. In each instance the catalyst was coated with more than 5 percent deposited carbon prior to the material balance period. Results of runs 6 and 7 indicate that silica-alumina-zirconia behaves substantially the same as silica-alumina toward ortho-cresol.

The silica-magnesia of run 8 contained about 88 percent silica and about 12 percent magnesia. The silica-magnesia catalyst (an acidic cracking catalyst of the oxide type like silica-alumina) resulted in markedly low conversions and low liquid recoveries as compared with silica-alumina.

In general, the isomerization of ortho-cresol to meta-cresol in preference to para-cresol is favored by lower reaction temperatures, e. g., 500–600° F., high partial pressure of ortho-cresol feed, short catalyst contact times and higher carbon content catalysts, e. g., 10 percent and greater carbon by weight.

Several experimental runs using xylenols as feedstock in my new process are summarized in Table III. The catalyst employed in the runs was a silica-alumina catalyst containing about 88% silica and 12% alumina.

*Table III.—Xylenols*

| Run No. | 9 | 10 | 11 | 12 | 13 |
|---|---|---|---|---|---|
| Feed Xylenol [1] | 2,6- | 2,4- | 3,4- | 2,5- | [2]Mixture |
| Temperature, °F | 550 | 650 | 650 | 550 | 600 |
| Partial Pressure, atm | 0.92 | 0.40 | 0.40 | 0.37 | 0.40 |
| VMSV | 1.28 | 7.0 | 7.0 | 12.1 | 7.0 |
| Results: | | | | | |
| Conversion (Wt. Percent of Feed) | 81.4 | 88 | 91 | 38.1 | ([3]) |
| Liquid Recovery (Wt. Percent of Converted Feed) | 96.0 | 92.4 | 92.7 | 96.8 | 93.5 |
| Yield as Wt. Percent of Converted Feed: | | | | | |
| Neutrals | 0.0 | 1.2 | 1.3 | 0.0 | 0.0 |
| Phenol | 3.8 | 2.6 | 1.4 | 0.0 | 11.8 |
| Cresols | 26.3 | 22.4 | 21.2 | 19.5 | [4]20.9 |
| Xylenols | 35.8 | 26.9 | 31.6 | 51.5 | 40.3 |
| Trimethyl Phenols | 22.8 | 28.5 | 23.7 | 25.8 | 12.0 |
| Residue | 2.5 | 10.8 | 13.6 | 0.0 | 8.4 |
| Gas | 0.05 | 0.0 | 0.0 | 0.1 | 0.0 |
| Carbon | 3.9 | 7.6 | 7.3 | 3.1 | 6.5 |
| Xylenol Analysis, Percent by Weight of Product Xylenols: | | | | | |
| 2,3-xylenol | 5.9 | 12.5 | 13.4 | 15.3 | 4.2 |
| 2,4-xylenol | 32.4 | | 30.3 | 46.4 | |
| 2,5-xylenol | 31.9 | 35.8 | 28.3 | | 16.4 |
| 2,6-xylenol | | 16.4 | 7.4 | 7.3 | 7.9 |
| 3,4-xylenol | 20.2 | 10.4 | | 15.7 | 6.0 |
| 3,5-xylenol | 9.6 | 24.9 | 20.6 | 15.3 | 5.8 |

[1] The numbers in the table identify the positions of the methyl groups where the hydroxyl group is in the number one position.
[2] 50 percent by weight, 2,4-xylenol, 50 percent by weight ortho-cresol.
[3] Conversion of ortho-cresol was 38.5 percent; of 2,4-xylenol, 72.7 percent.
[4] 14.1 percent meta-cresol, 6.8 percent para-cresol.

The data in Table III are indicative of the xylenol conversions resulting from my new process. High conversion rates are accompanied by high liquid recoveries. Significant quantities of the valuable (for resin purposes) 3,5-xylenol as well as all other isomers are produced from the less valuable 2,4-xylenol and 3,4-xylenol. Phenol and cresols are produced in appreciable quantities, chiefly by the disproportionation reaction as is evidenced by the absence of gas production and by the fact that the yield of phenol and cresols corresponds to the trimethyl phenol yield. The negligible quantity of neutral compounds indicates that virtually no dehydroxylation occurs.

Run No. 13 was conducted with a feedstock having equal weights of ortho-cresol and 2,4-xylenol. The results establish that my new process is capable of isomerizing mixtures of methyl substituted phenols. The xylenol conversion was 72.7 percent; cresol conversion was 38.5 percent.

I have also found that the desired cresol isomerization reaction can be increased by suppressing the disproportionation reactions. Through the addition of an appreciable quantity of xylenols to the cresols, the cresol disproportionation equilibrium is displaced and the reaction thereby suppressed. In general the cresols should be mixed with from one-half to twice their weight of xylenols in order to achieve the increased isomerization. For example, in run No. 13 of Table III, equal weights of 2,4-xylenol and ortho-cresol were processed. The product contains meta-cresol, para-cresol and phenol in an amount equal to 94.5 percent of the converted ortho-cresol. Moreover the quantity of xylenols available for recycle to the process is 72.1 percent of the xylenol introduced with the feed cresols.

The isomerization and disproportionation of the trimethyl phenols in accordance with my invention is preferably carried out at temperatures in the lower portion of the temperature range 450 to 700° F., e. g., around 500° F. As the temperature is raised beyond this point cracking of the methyl groups becomes appreciable. The production of phenol, cresols, and xylenols is increased by effecting the conversion at the lower temperatures.

According to the provisions of the Patent Statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method for isomerizing and disproportionating methyl phenols selected from the class consisting of unsubstituted cresols, unsubstituted xylenols and unsubstituted trimethyl phenols, which comprises contacting said methyl phenols in a vapor phase at a temperature of 450–700° F. with a silica-alumina catalyst having carbon deposited thereon in an amount equal to from at least 5 percent to about 20 percent of the weight of said catalyst, and collecting the product vapors.

2. The method of claim 1 in which the methyl phenol vapor is diluted with an inert gas prior to contacting the catalyst.

3. The method of claim 1 in which the methyl phenols consist of a mixture of unsubstituted cresols and unsubstituted xylenols.

4. The method for isomerizing and disproportionating methyl phenols selected from the class consisting of unsubstituted cresols, unsubstituted xylenols and unsubstituted trimethyl phenols, which comprises contacting said methyl phenols in the vapor phase at a temperature of 450–700° F. with a silica-alumina catalyst consisting essentially of 1 to 50 percent alumina and 99 to 50 percent silica, said catalyst having carbon deposited thereon in an amount equal to from at least 5 percent to about 20 percent of the weight of silica-alumina, and collecting the product vapors.

5. The method for isomerizing and disproportionating methyl phenols selected from the class consisting of unsubstituted cresols, unsubstituted xylenols and unsubstituted trimethyl phenols, which comprises contacting said methyl phenols at a temperature of 450–700° F. with a catalyst consisting essentially of 1 to 20 weight percent alumina and 99 to 80 weight percent silica, said catalyst having carbon deposited thereon in an amount equal to from at least 5 percent to about 20 percent of the weight of silica and alumina, and collecting the product vapors.

6. The method of isomerizing cresols which comprises contacting said cresols in the vapor phase at a temperature of 450–700° F. with a silica-alumina catalyst having carbon deposited thereon in an amount which is from at least 5 percent to about 20 percent of the weight of silica-alumina, and collecting the product vapors.

7. The method of isomerizing xylenols which comprises contacting said xylenols in the vapor phase at a temperature of 450–700° F. with a silica-alumina catalyst having carbon deposited thereon in an amount equal to from at least 5 percent to about 20 percent of the weight of silica-alumina, and collecting the product vapors.

8. The method of isomerizing ortho-cresol into meta- and para-cresol which comprising contacting said ortho-cresol in the vapor phase at a temperature of 450–700° F. with a silica-alumina catalyst having carbon deposited thereon in an amount equal to from at least 5 percent to about 20 percent of the weight of silica-alumina, and collecting the product vapors.

9. The method of catalytically isomerizing cresols which comprises mixing each volume of cresol with one-half to two volumes of xylenols, contacting the resulting mixture in the vapor phase at a temperature of 450–700° F. with a silica-alumina catalyst having carbon deposited thereon in an amount equal to from at least 5 percent to about 20 percent of the weight of silica-alumina, collecting the product vapors and recovering isomerized cresols therefrom.

10. The method of isomerizing ortho-cresol into meta-cresol which comprises passing said ortho-cresol at 450 to 700° F. through a silica-alumina catalyst having carbon deposited thereon from about 10 to about 20 percent of the weight of said cracking catalyst, and collecting the product vapors containing meta-cresol.

11. The method of catalytically isomerizing and disproportionating methyl phenols having no more than three methyl substituents, which comprises passing said methyl phenols in the vapor phase at a temperature of 450–700° F. through a bed of silica-alumina catalyst having carbon deposited thereon in an amount equal to from at least 5 percent to about 20 percent of the weight of silica-alumina, collecting the product vapors, withdrawing high carbon content catalyst from said bed, regenerating said high carbon content catalyst by burning substantially all of the carbon deposited thereon, depositing carbon upon said regenerated catalyst in an amount equal to at least 5 percent by weight of the catalyst and returning the carbon coated regenerated catalyst to said bed.

12. In a continuous process for catalytically isomerizing and disproportionating methyl phenols selected from the class consisting of unsubstituted cresols, unsubstituted xylenols and unsubstituted trimethyl phenols, the steps comprising continuously passing said methyl phenols in the vapor phase at a temperature of 450 to 700° F. through a bed of silica-alumina catalyst having carbon deposited thereon in an amount equal to from at least 5 percent to about 20 percent of the weight of silica-alumina, recovering product vapors from said silica-alumina bed, continuously withdrawing high carbon content catalyst from said bed, continuously regenerating said high carbon content catalyst, and continuously returning regenerated catalyst with a carbon coating of at least 5 percent of the weight of the catalyst to said bed.

13. The method of continuously catalytically isomerizing and disproportionating methyl phenols selected from the class consisting of unsubstituted cresols, unsubstituted xylenols and unsubstituted trimethyl phenols, which comprises continuously passing said methyl phenols in the vapor phase at a temperature of 450 to 700° F. through a bed of silica-alumina catalyst having carbon deposited thereon in an amount equal to from at least 5 percent to about 20 percent of the weight of silica-alumina, recovering product vapors from said silica-alumina bed, continuously withdrawing high carbon content catalyst from said bed, continuously regenerating said high carbon content catalyst by burning carbon deposited thereon except for a residual amount of carbon corresponding to at least 5 percent of the weight of silica-alumina, and continuously returning the carbon coated regenerated catalyst to said bed.

14. The method of catalytically isomerizing and disproportionating methyl phenols selected from the class consisting of unsubstituted cresols, unsubstituted xylenols and unsubstituted trimethyl phenols, which comprises cyclically first passing said methyl phenols in the vapor phase at a temperature of 450 to 700° F. through a bed of silica-alumina catalyst having carbon deposited thereon in an amount equal to from at least 5 percent to about 20 percent of the weight of silica-alumina, recovering product vapors from said silica-alumina bed, thereafter regenerating high carbon content catalyst by burning substantially all of the carbon deposited thereon, depositing carbon upon thus regenerated catalyst in an amount equal to at least 5 percent of the weight of silica-alumina, and repeating the cycle.

15. The method of catalytically isomerizing and disproportionating methyl phenols selected from the class consisting of unsubstituted cresols, unsubstituted xylenols and unsubstituted trimethyl phenols, which comprises cyclically first passing said methyl phenols in the vapor phase at a temperature of 450 to 700° F. through a bed of silica-alumina catalyst having carbon deposited thereon in an amount equal to from at least 5 percent to about 20 percent of the weight of silica-alumina, recovering product vapors from said silica-alumina bed, thereafter regenerating high carbon content catalyst by burning carbon deposited thereon except for a residual amount of carbon corresponding to at least 5 percent of the weight of silica-alumina, and repeating the cycle.

References Cited in the file of this patent

UNITED STATES PATENTS

| | | |
|---|---|---|
| 2,253,486 | Belchetz | Aug. 19, 1941 |
| 2,418,689 | Benedict et al. | Apr. 8, 1947 |
| 2,514,960 | Luten et al. | July 11, 1950 |

FOREIGN PATENTS

| | | |
|---|---|---|
| 874,911 | Germany | Sept. 4, 1952 |

OTHER REFERENCES

Nakai: Bull. Chem. Soc., Japan, vol. 5 (April 1930), pp. 142, 152–156 (6 pages; complete article pp. 136–157).